R. H. MUELLER.
INTERCHANGEABLE REGULATOR AND RELIEF VALVE.
APPLICATION FILED JULY 9, 1917.
1,410,070.
Patented Mar. 21, 1922.
3 SHEETS—SHEET 1.
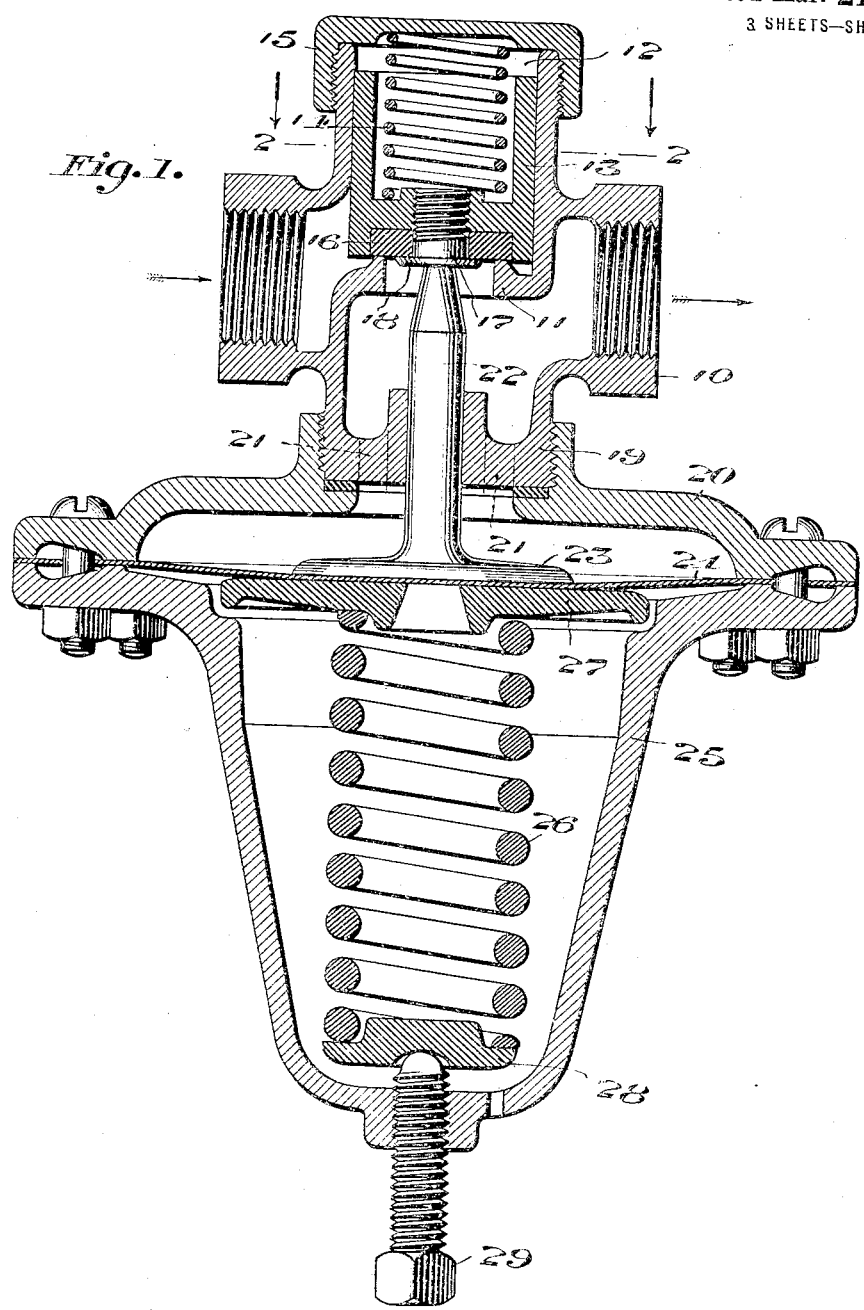
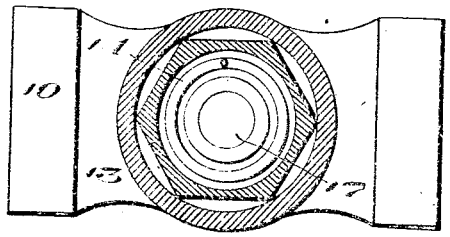
Inventor
Robert H. Mueller
Witnesses
Attorney

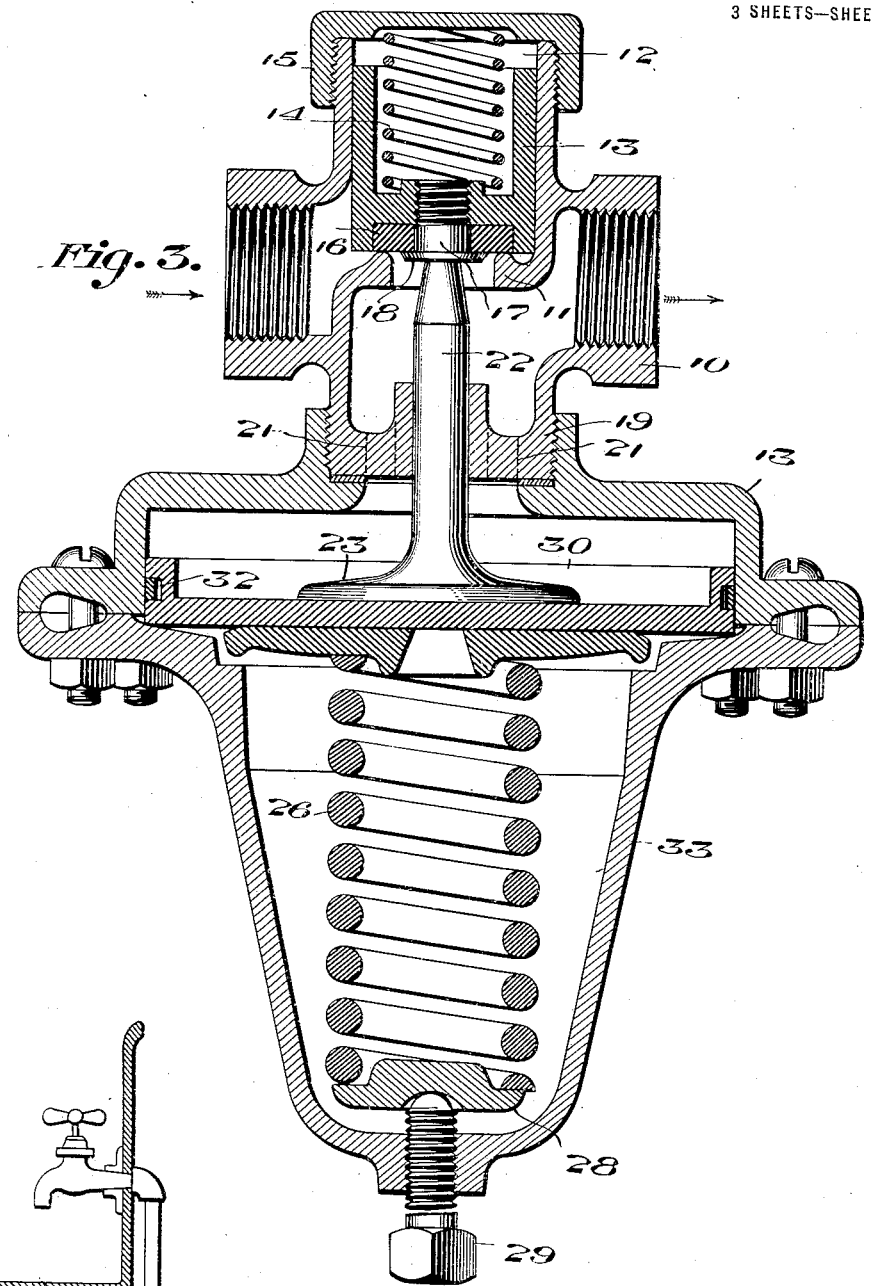
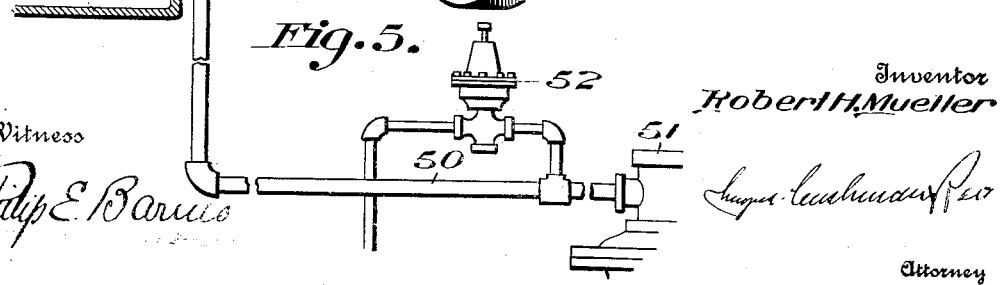

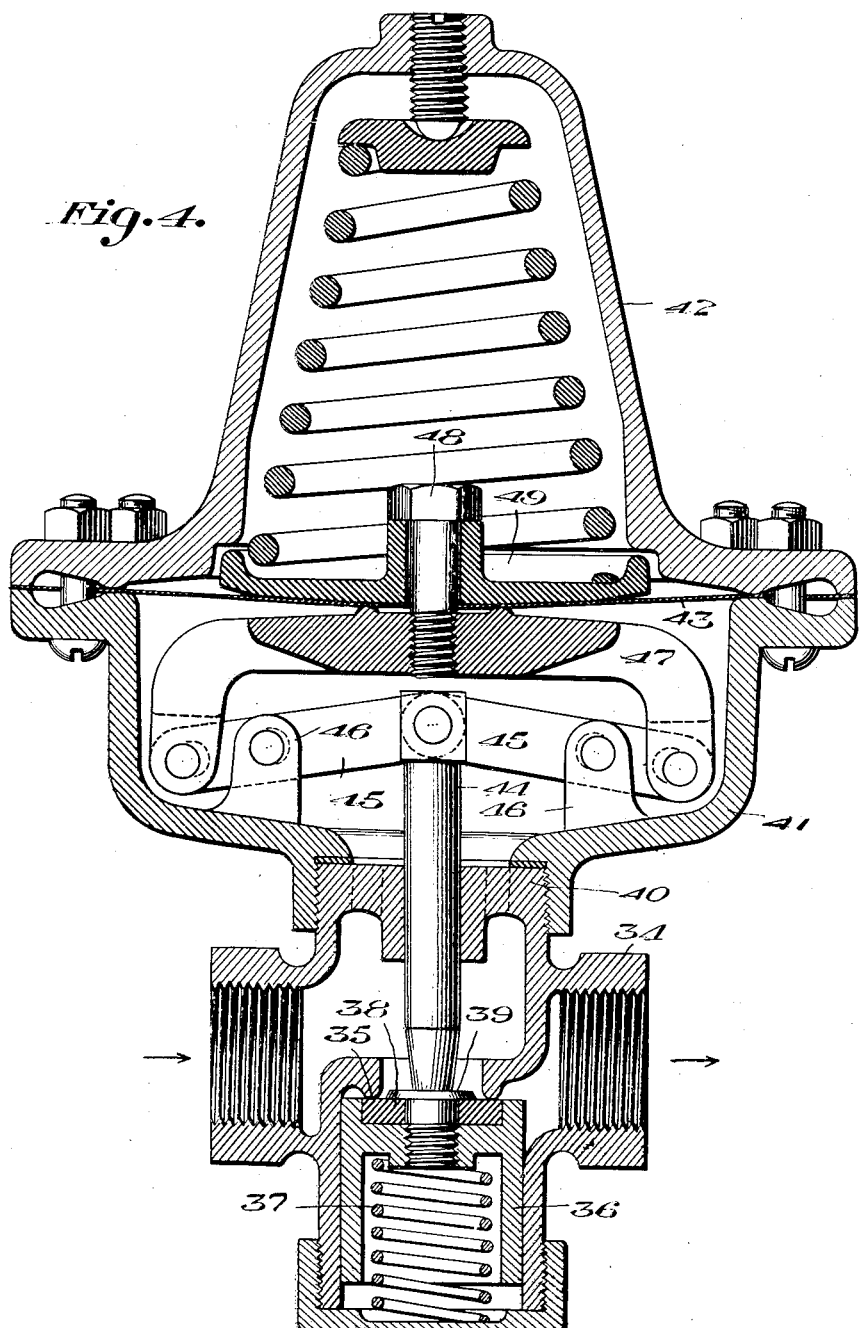

UNITED STATES PATENT OFFICE.

ROBERT H. MUELLER, OF DECATUR, ILLINOIS, ASSIGNOR TO ADOLPH MUELLER, TRUSTEE, OF DECATUR, ILLINOIS.

INTERCHANGEABLE REGULATOR AND RELIEF VALVE.

1,410,070.  Specification of Letters Patent.  Patented Mar. 21, 1922.

Application filed July 9, 1917. Serial No. 179,593.

*To all whom it may concern:*

Be it known that I, ROBERT H. MUELLER, a citizen of the United States, residing at Decatur, in the county of Macon and State of Illinois, have invented new and useful Improvements in Interchangeable Regulator and Relief Valves, of which the following is a specification.

This invention relates to pressure regulating and pressure relief valves, and has for its object to provide a valve which is equally useful, either for the regulation of pressure, or for the relief of pressure, and in which the valve will be sufficiently sensitive to give a close control of the pressure.

A further object of the invention is to provide a valve in which some of the valve parts may be made of non-corrosive metal so as to give a valve chamber, valve seat, and valve which will be efficient and capable of long service, without any interference from the corrosive effects of the fluid passing through it, while at the same time the chambers carrying certain of the valve operating instrumentalities, as, for example, a pressure actuated diaphragm or piston, and other parts, may be made of a less expensive metal.

Furthermore the construction is such that the valve casing and the diaphragm or piston casing may be separated without the necessity of taking down or disturbing the valve parts in the valve casing, or valve operating parts in the diaphragm casing, thus rendering easy the matter of replacement or repair of the parts, and, furthermore, permitting the ready substitution of valve casings of greater or less capacity, or the substitution of different diaphragm casings, in which latter event the valve casing need not be disturbed or taken out of the line.

In order that the invention may be clear to those skilled in the art I have shown in the accompanying drawings one embodiment thereof, and in said drawings:—

Figure 1 is a view in vertical section of a regulating valve.

Figure 2 is a cross sectional view substantially on the line 2—2 of Figure 1, looking in the direction of the arrow.

Figure 3 is a view similar to Figure 1, showing the piston mechanism for actuating the valve, as distinguished from the diaphragm mechanism shown in Figure 1.

Figure 4 is a view in vertical section of my invention adapted for use as a relief valve.

Figure 5 is a diagrammatic view showing the layout conventionally of a service pipe with the relief valve fitted thereto.

Referring to the drawings by numbers, like numbers indicating like parts in the several views, and having reference first to Figure 1, 10 indicates a valve casing having an inlet and outlet, and provided with a web 11 having formed thereon a valve seat. On the inlet side of the valve seat, as shown in Fig. 1, is a valve chamber 12 having mounted therein a valve 13, which, as shown in Fig. 2, is of such shape in cross section that inlet pressure may enter the chamber 12 and stand against the valve 13, this valve being preferably hollow, as shown, and containing the spring 14 compressed between the cap 15 of the chamber and the valve, and tending to hold the said valve 13 normally to its seat. The valve 13 is provided on its seating face with a suitable packing 16 to engage the valve seat, this valve packing 16 being preferably held in place by means of the screw 17 having the extended flange or head 18, as shown, which flange or head not only effectively clamps the packing 16 in place when the screw 17 is screwed to its seat, but has also the function of an abutment against which the valve-operating pusher post, about to be described, operates.

The valve casing 10 is provided at its end opposite the valve chamber 12 with a nipple 19, preferably threaded, as shown, and engaging a threaded seat in the member 20 of the diaphragm chamber, and the said nipple 19 has through passages 21, (shown in dotted lines), to permit outlet pressure to pass into the diaphragm chamber. The said nipple 19 has as well a centrally disposed passage to receive the valve operating pusher post 22, the upper end of which engages loosely with the flange 18 of the screw 17. At its upper end the said pusher post 22 is provided with an enlarged foot 23, which stands loosely upon the diaphragm 24 clamped between the upper member 20 of the diaphragm chamber and the lower member 25 of the diaphragm chamber, as shown. Within the diaphragm member 25 is the operating spring 26 which bears at its upper end against a diaphragm plate 27, and at its lower end is supported by a disk 28, which in turn is upheld by an adjusting bolt or screw 29, by means of which the tension of the spring 26 may be adjusted.

It will be observed that the valve chamber 10 contains all of the valve parts proper, so mounted as that when the said valve casing is separated from the diaphragm casing all of the valve parts are removed with it, and the nipple 19 when unscrewed from the diaphragm casing may be taken off without disturbing any of the parts, the valve actuating pusher post 22 being so arranged as to permit ready withdrawal of it from the valve casing 10.

By this arrangement, and by simply standardizing the nipple 19 and its receiving seat in the diaphragm member 20, valve casings of different capacities may be substituted without the necessity of changing the diaphragm casing, and in event of it being desirable to change the diaphragm casing and substitute therefor a diaphragm of different capacity, this may be done without taking the valve casing 10 out of the line, by simply unscrewing the diaphragm casing, for, as has been pointed out, the two casings, except for the connection of the nipple 19, are independent and capable of easy separation. In other words I have provided two self-contained casings, one the valve casing, and the other the diaphragm casing, so connected as that while their co-operation is efficient, as soon as they are coupled, they may, nevertheless, be taken apart without disturbing the operating parts, for, as above stated, the valve 13, and the operating pusher post 22 are loosely engaged, and, furthermore, the pusher post 22 has the free sliding connection with the nipple 19 of the valve chamber 10.

In that form of the invention shown in Fig. 3, the valve casing 10 and its contained parts, and the diaphragm casing are generally similar to the form shown in Fig. 1, but in lieu of the diaphragm shown in Fig. 1, I provide a piston 30 mounted in a piston chamber formed in the upper member 31 of the diaphragm chamber, and having a fluid tight packing 32 which seals the piston against passage of the fluid to the lower member 33 of the diaphragm casing, but which will permit the said piston 30 to move freely in its chamber in action.

The constructions disclosed in Figs. 1 and 3 are designed more particularly for regulating pressures, the valve 13 being controlled by outlet pressure, and the operation is the usual one with regulating devices of this kind. Outlet pressure standing against the diaphragm 24 in the form shown in Fig. 1, or the piston 30 in the form shown in Fig. 3, will force the diaphragm and pusher post downwardly, so that no pressure is exerted to open the valve 13, which will be held closed by outlet pressure and the seating spring 14. Immediately outlet pressure falls below that for which the regulator is set, the lifting spring 26 will elevate the diaphragm or piston, lift the loose pusher post 22, and it in turn will raise the valve 13 from its seat, permitting inlet pressure to pass the valve until the required outlet pressure has been again restored.

It will be obvious, of course, that when the regulator is installed, pressure will stand against the valve 13, and, together with the spring 14, will hold it to its seat so that no fluid can pass to the outlet or delivery side. To initiate the operation of the regulator, the adjusting screw 29 will be turned inwardly, compressing the spring 26 and forcing the diaphragm 24 or piston 30, as the case may be, upwardly, impinging the pusher post 22 against the valve until the valve is opened, the service pipe on the delivery side of the regulator filled, and pressure accumulates on the outlet or house service side of the regulator sufficient to exert the regulating back pressure upon the diaphragm or piston, compressing the spring 26, and withdrawing the pusher post 22 so as to permit the valve 13 to close. Immediately this condition of adjustment is reached, the action of the regulator thereafter will be entirely automatic and inlet and delivery pressures be maintained at the ratio desired. It will be clear that since the valve and pusher pin which are controlled by the diaphragm and spring are not positively connected, then any derangement or breaking of the diaphragm, pusher pin, or spring, will not affect the valve 13, as this will remain closed.

In that form of the invention disclosed in Figure 4, I have adapted the construction to a relief valve so that excess of pressure on the inlet side of the valve will at once cause the valve to open and relieve the pressure in the line. Furthermore, by the construction which I shall presently describe in detail, I secure a very quick opening action of the valve, so that instant relief to the line is given, and there is no appreciable period of time between the instant of excess of pressure and the opening of the valve, which is, of course, desirable for the sudden running up of the pressure, unless immediate relief is given, might cause damage, and a sluggish or retarded opening of the relief valve would not suffice to take care of such an abnormal condition.

In that form the valve casing 34 has the valve seat 35 and valve 36, which valve is held to the seat by the spring 37, the valve packing 38, and flanged holding screw 39, being arranged as described in connection with the construction heretofore discussed. The valve casing has the nipple 40 threaded to the seat in the diaphragm member 41, which diaphragm member 41 is coupled to the member 42 carrying the spring and adjusting screw, the diaphragm 43 being clamped between them. The said valve is controlled by pusher-post 44, which passes loosely through an opening in the nipple 40, and loosely engages the flange of the screw 39 on the valve 36 in the manner heretofore described. The said pusher post 44 at its opposite end is coupled to levers 45 fulcrumed to lugs 46 formed within the diaphragm member 41, these levers at their opposite ends engaging the downwardly turned ends of a yoke 47, the engagement being a slot and pin, as shown, or its equivalent, loosely engaged to permit the parts to move without binding. The yoke 47 is clamped to the diaphragm 43 by means of a bolt 48 which engages on the opposite side of the diaphragm the spring receiving plate 49, so that the plate 49, diaphragm 43, and yoke 47 move together and serve to operate the levers 45 and the pusher post 44 as the diaphragm moves. It will be observed that the levers 45 are arranged with their long ends engaging the pusher post 44, being connected at their short ends with the arms of the yoke 47. By this disposition of the levers a slight movement of the diaphragm and yoke will be multiplied through the levers 45, and a greater degree of thrust or movement given to the pusher post 44, so as to give a corresponding quick and increased movement of the valve 36, and insure a proper opening for release of excess pressure.

In operation the pressure coming from the inlet side of the valve casing 34 will stand against the diaphragm 43, which diaphragm will be maintained in the normal position shown in Fig. 4 by its actuating spring so long as the pressure in the system remains constant, and in that position of the parts the yoke 47 will, of course, tend to maintain the levers in the position shown, with the pusher post 44 exerting no pressure against the valve 36, which will be held in closed position by the spring 37. Immediately inlet pressure standing against the diaphragm 43 runs up to the danger point, or beyond the point for which the diaphragm spring is set, the diaphragm will be lifted, the spring compressed, and lifting of the yoke 47 will throw the levers 45 and the pusher post 44 downwardly, forcing the pusher rod against the valve 36 and opening that valve, so as to relieve the pressure, this excess pressure passing to any desired point, as, for example, to a suitable waste pipe. Upon relief of excess pressure the parts will at once resume the normal position shown in Fig. 4, with the valve in closed position.

It will be seen that while the relief valve 36 is operated under normal conditions by movement of the diaphragm, levers and pusher-pin arrangement just described, that since the pusher-pin 44 and the valve 36 have no positive connection with one another, said valve 36 would be free to move under excessive pressure even if the diaphragm and its connected parts were broken or deranged. The spring 37 which holds the valve 36 to its seat is of a strength but little more than is necessary to hold the valve to its seat against the normal or predetermined pressure, so that upon a relatively slight increase of pressure above normal, the valve 36 will open even though the pusher pin and its associated parts should have, for any reason, become inoperative. For example, if the relief valve was set to open in a normal way through the action of the diaphragm and the pusher pin upon the valve 36 when a certain pressure had been reached, and the diaphragm and its connected parts become deranged or broken, the valve 36 would still be free to open at slightly greater pressures, and throw the excess pressure to the waste pipe so that a double element of safety is secured by reason of this construction.

It is to be understood, however, that the diaphragm-actuating levers and pusher pin are desirable and necessary, as they give a very sensitive and smoothly operating mechanism for controlling the valve under normal conditions.

In Figure 5, I have shown one practical application of my device, this showing being diagrammatic, and in that view 50 indicates a service pipe, such as a house service pipe, which comes from a suitable inlet or regulator 51, which is connected with the main supply pipe.

The relief device 52, heretofore described in detail is preferably installed in the house service pipe 50, so that the service pressure is always standing in the valve and diaphragm chambers, and immediately pressure in the service pipe 50 is raised above the desired point this relief valve 52 will operate as heretofore described, and immediately throw away excessive pressure and maintain house service pressure at its proper and normal condition.

The construction as pointed out permits the interchange of different valve chambers without disturbing the diaphragm chamber or its operating parts, thus making the device readily adaptable for different services, such as hot and cold water, oil, steam, gas or air, these different fluids, and certain conditions of installation frequently requiring different valve seat openings or parts for efficient service. Furthermore, the device provides for a very close regulation of fluid pressures and is equally responsive to any pressure changes varying from the normal or predetermined pressure, and it gives a device which insures absolute safety and protection for the house service pipes either under normal conditions, or when by reason of derangement of the valve-actuating parts the conditions have become abnormal.

It is to be understood that such changes as may be made within the range of mechanical skill in the practice of my invention are not to be regarded as departures from the particular disclosure herein, as this disclosure is illustrative of one embodiment of my invention, and not restrictive thereof.

I claim:—

1. In a device of the class described and in combination, a valve casing having a valve seat, a valve in said casing, a diaphragm casing separably connected and in fluid communication with said valve casing, a diaphragm in said diaphragm casing, valve operating means in said diaphragm casing and under the control of said diaphragm projecting into and loosely engaging said valve, and a perforated partition in said valve casing through which said valve operating means passes to maintain said operating means in operative relation to said valve and give fluid connection between said valve and diaphragm casings, the said valve operating means being disengageable from the said guiding means upon disconnecting said valve casing and diaphragm casing.

2. In a device of the class described and in combination, a valve casing having a valve seat, a valve in said casing, a diaphragm casing separably connected and in fluid communication with said valve casing, a diaphragm in said diaphragm casing, valve operating means in said diaphragm casing and under the control of said diaphragm having a valve operating post projecting into said valve chamber and through said valve seat in loose engagement with said valve, and a perforated partition in said valve casing through which said valve operating post passes to maintain said post in operative relation to said valve and give fluid connection between said valve and diaphragm casings, said guide and valve operating means being readily disengageable upon disconnecting said valve casing and diaphragm casing.

3. In a device of the class described and in combination, a valve casing having a valve seat, a spring seated valve in said casing, a diaphragm casing separably connected and in fluid communication with said valve casing, valve operating means loosely mounted on said diaphragm and having a post projecting into said valve casing and through said valve seat in loose engagement with said spring seated valve, and an integral perforated partition in the bottom of said valve casing through which said valve operating post passes to maintain said post in operative relation to said valve and give fluid connection between said valve and diaphragm casings, said valve operating means being readily disengageable from said guiding means upon disconnecting the said valve casing and diaphragm casing.

In testimony whereof I have hereunto set my hand in presence of two subscribing witnesses.

ROBERT H. MUELLER.

Witnesses:
 Roy B. Pease,
 Henry D. Plate.